United States Patent
Jankovic

(10) Patent No.: US 9,080,525 B2
(45) Date of Patent: *Jul. 14, 2015

(54) FUEL COMPONENT IDENTIFICATION

(75) Inventor: Mrdjan J. Jankovic, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 680 days.

This patent is subject to a terminal disclaimer.

(21) Appl. No.: 13/437,834

(22) Filed: Apr. 2, 2012

(65) Prior Publication Data

US 2013/0261935 A1 Oct. 3, 2013

(51) Int. Cl.
| F02D 41/30 | (2006.01) |
| F02D 28/00 | (2006.01) |
| F02D 41/04 | (2006.01) |
| F02D 41/14 | (2006.01) |
| F02D 41/00 | (2006.01) |
| F02D 19/08 | (2006.01) |
| F02D 41/40 | (2006.01) |

(52) U.S. Cl.
CPC ............ *F02D 41/047* (2013.01); *F02D 19/087* (2013.01); *F02D 41/0025* (2013.01); *F02D 41/1456* (2013.01); *F02D 41/1458* (2013.01); *F02D 41/40* (2013.01); *F02D 2041/1432* (2013.01); *F02D 2200/021* (2013.01); *F02D 2200/0402* (2013.01); *F02D 2200/0406* (2013.01); *F02D 2200/0612* (2013.01); *F02D 2200/101* (2013.01); *Y02T 10/36* (2013.01)

(58) Field of Classification Search
CPC . F02D 19/087; F02D 19/088; F02D 41/0025; F02D 41/047; F02D 41/1456; F02D 2041/1432; F02D 2200/0612; F02D 41/1458

USPC ............ 73/29.01, 29.03, 61.43, 61.77, 64.45, 73/64.46; 123/1 A, 294, 304, 381, 406.47, 123/429–433, 518, 574; 701/102, 104

See application file for complete search history.

(56) References Cited

U.S. PATENT DOCUMENTS

| 5,220,895 | A | 6/1993 | Curran et al. |
| 5,390,640 | A * | 2/1995 | Saito et al. .................... 123/491 |
| 6,758,201 | B2 * | 7/2004 | Hosoi ........................... 123/679 |
| 7,523,723 | B2 * | 4/2009 | Marriott et al. ............... 123/1 A |
| 7,523,744 | B2 | 4/2009 | Ayame |
| 7,650,874 | B2 * | 1/2010 | Takubo .......................... 123/434 |
| 7,712,446 | B2 * | 5/2010 | Hosokawa et al. ....... 123/179.18 |
| 7,735,469 | B2 * | 6/2010 | Miyata et al. ................. 123/399 |
| 7,874,143 | B2 * | 1/2011 | Wanibe .......................... 60/285 |
| 7,908,073 | B2 * | 3/2011 | Takubo .......................... 701/103 |
| 8,042,518 | B2 * | 10/2011 | Jankovic et al. .............. 123/429 |
| 8,113,180 | B2 * | 2/2012 | Jankovic et al. .............. 123/518 |
| 2009/0064767 | A1 * | 3/2009 | Roth ............................. 73/61.76 |
| 2011/0191006 | A1 * | 8/2011 | Nishida et al. ................ 701/103 |
| 2011/0202258 | A1 | 8/2011 | Fukushima et al. |

* cited by examiner

*Primary Examiner* — Thomas Moulis
*Assistant Examiner* — Elizabeth Hadley
(74) *Attorney, Agent, or Firm* — Julia Voutyras; Alleman Hall McCoy Russell & Tuttle LLP

(57) ABSTRACT

A method adjusts fuel injection based on a fuel make-up, such as a fuel ethanol content. The fuel make-up may be learned during transient conditions by correlating transient fueling effects caused by the different evaporation rates of higher and lower ethanol content to measured exhaust air-fuel ratio. In this way, an ethanol content independent of combustion stoichiometry can be obtained, even during transients, that is less sensitive to part variation and sensor drift.

20 Claims, 5 Drawing Sheets

US 9,080,525 B2

FUEL COMPONENT IDENTIFICATION

TECHNICAL FIELD

The present application relates to flex-fuel vehicles and fuel composition estimation therein.

BACKGROUND AND SUMMARY

Engines may operate with varying fuel blends. For example, vehicles may operate on a range of fuels supplied by the operator, ranging from pure gasoline to so-called E85 (an ethanol and gasoline blend with 85% ethanol). Various approaches are used by an engine controller to determine the fuel composition before engine operation. One approach to identifying the fuel make-up in a fuel tank is based on the shift in combustion stoichiometry caused by the varying fuel make-up. For example, at stoichiometry (e.g., as determined from the exhaust air-fuel ratio sensors), the amount of fuel delivered for the current amount of air is determined from injector characteristics. The stoichiometric ratio can then be estimated, thus enabling an ethanol content, for example, to be determined.

However, the inventors herein have recognized that while such an approach can be improved in various ways, it nevertheless remains highly susceptible to part-to-part variation and sensor drift. For example, changes in the injector characteristics can lead directly to errors in the ethanol estimate.

The above issues can be at least partially addressed by recognizing that the relationship between the fuel make-up and fuel evaporation on the engine intake ports, particularly during transient operation, can be used to infer the ethanol content of the fuel. This is because the ethanol content of the fuel affects how fuel evaporates from the puddles generated on the intake port during engine operation. Further, the effects of such fuel evaporation can be observed in the exhaust air-fuel ratio during transient operating conditions.

One example approach for determining the fuel composition includes adjusting engine operation in response to a fuel make-up, the fuel make-up based on variation in evaporation of fuel on an engine intake port. In this way, it is possible to more accurately account for the fuel make-up by reducing sensitivity to part-to-part variability and sensor drift. Further, the fuel make-up can be learned even during transient operation so that more accurate engine control can be provided during both transient and steady state operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
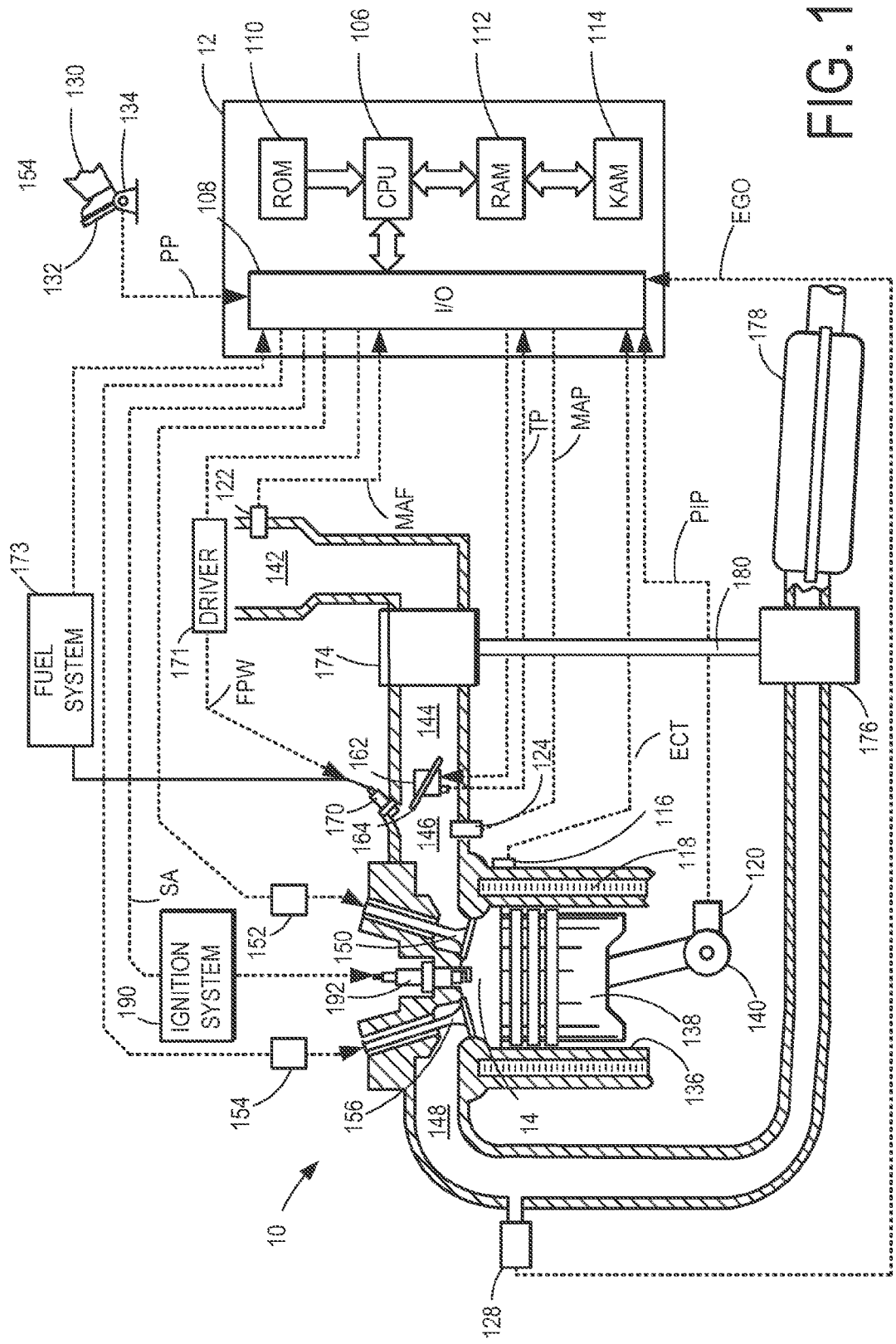
FIG. 1 shows a schematic depiction of an example engine in accordance with an embodiment of the present disclosure.
Figure 2:
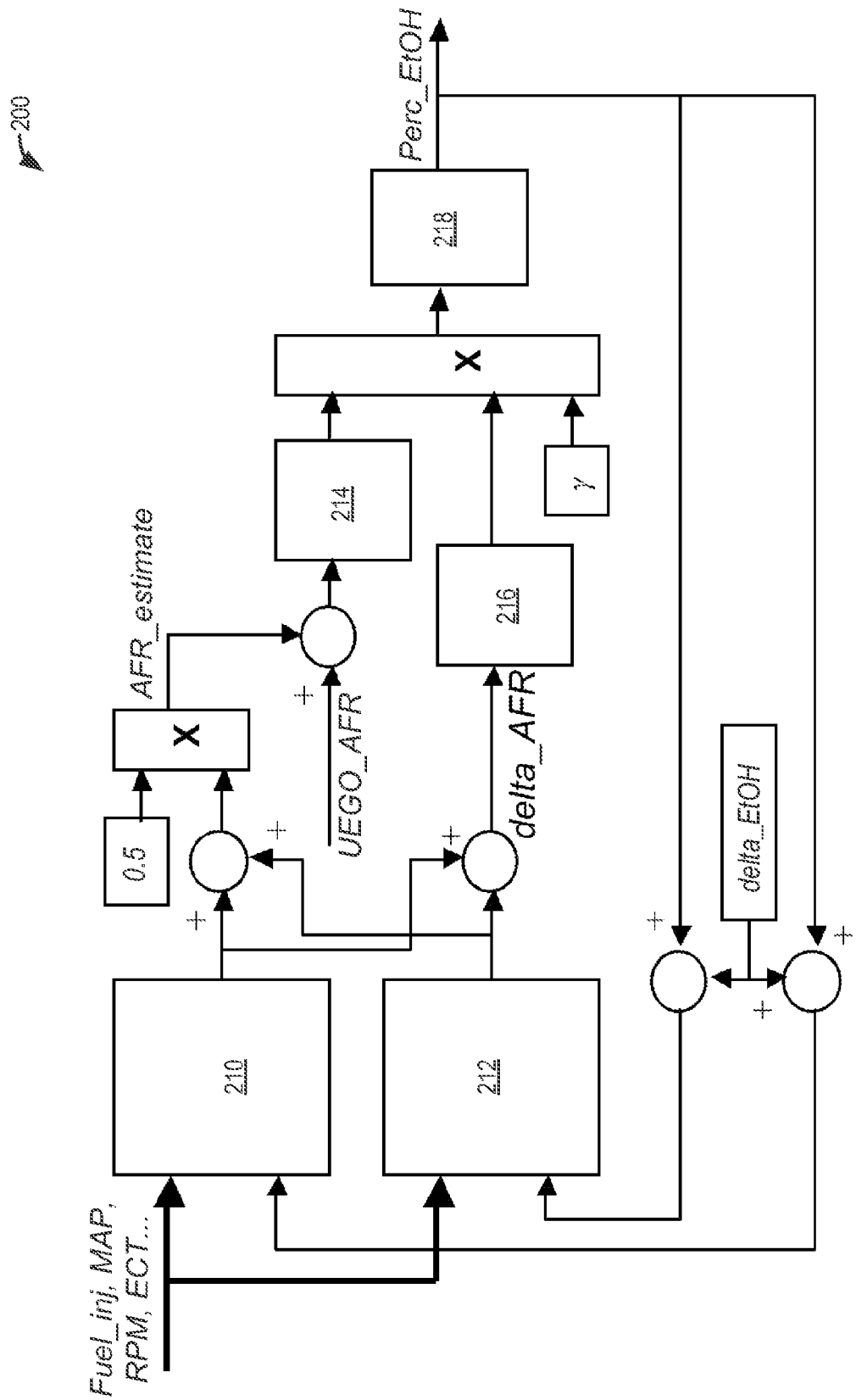
FIG. 2 shows a control system block diagram.
Figure 3:
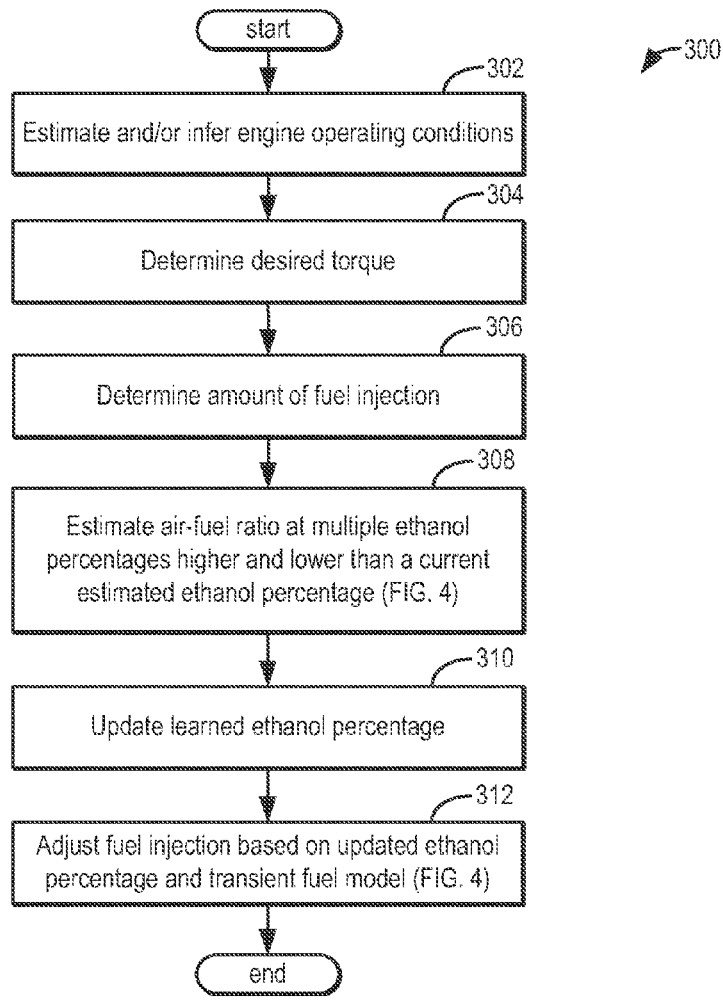
FIGS. 3-5 show example flow charts illustrating a method for determining a fuel make-up based on variation in evaporation of fuel on an engine intake port, and for adjusting engine operation in response to the determined fuel make-up.
Figure 4:
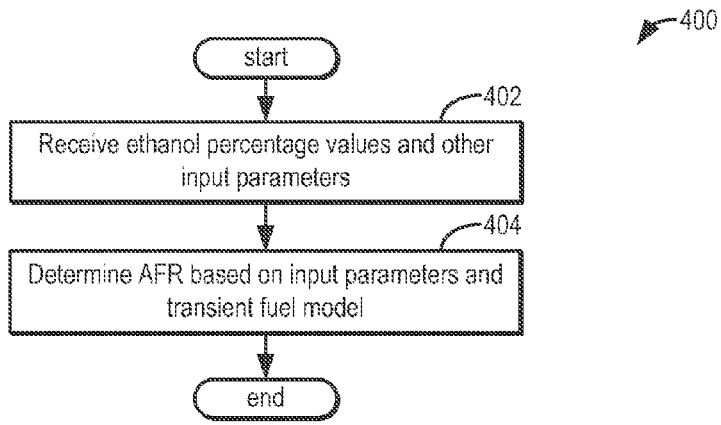
Figure 5:
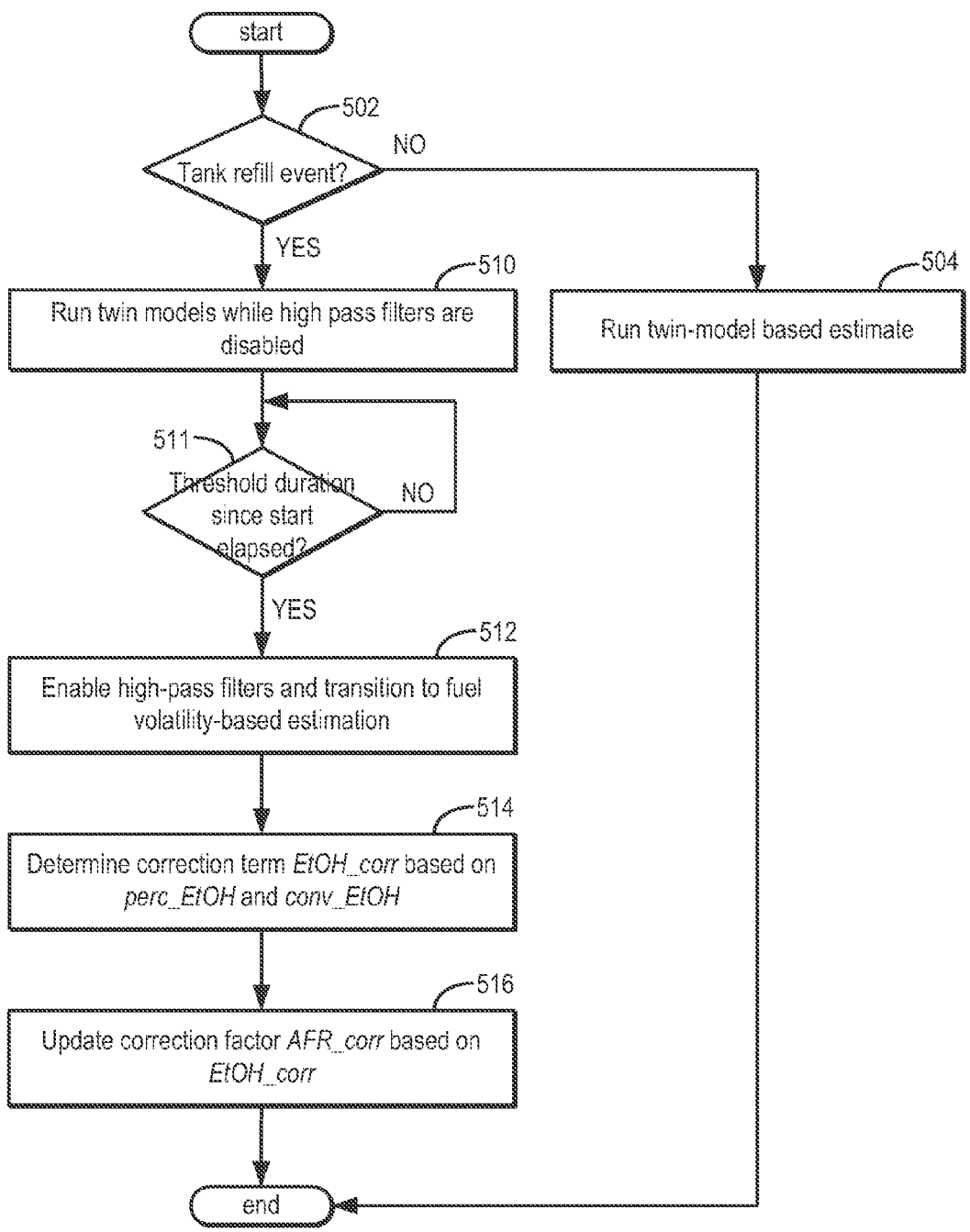
Figure 6:
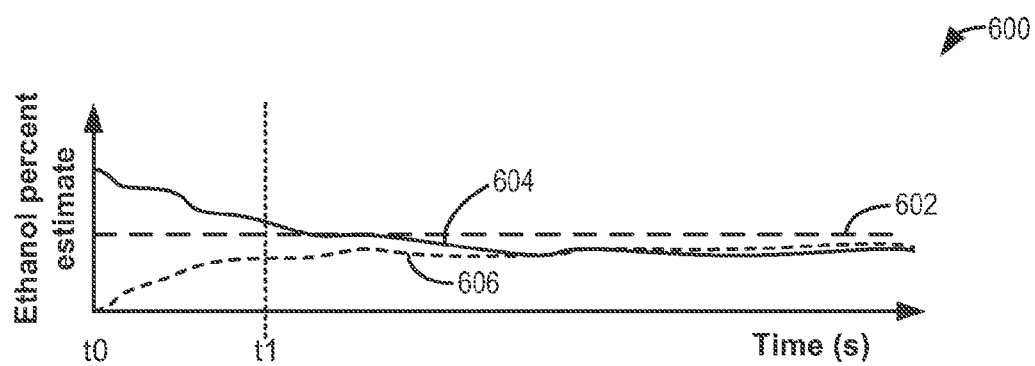
FIGS. 6-7 show example engine performance based on example test data.
Figure 7:
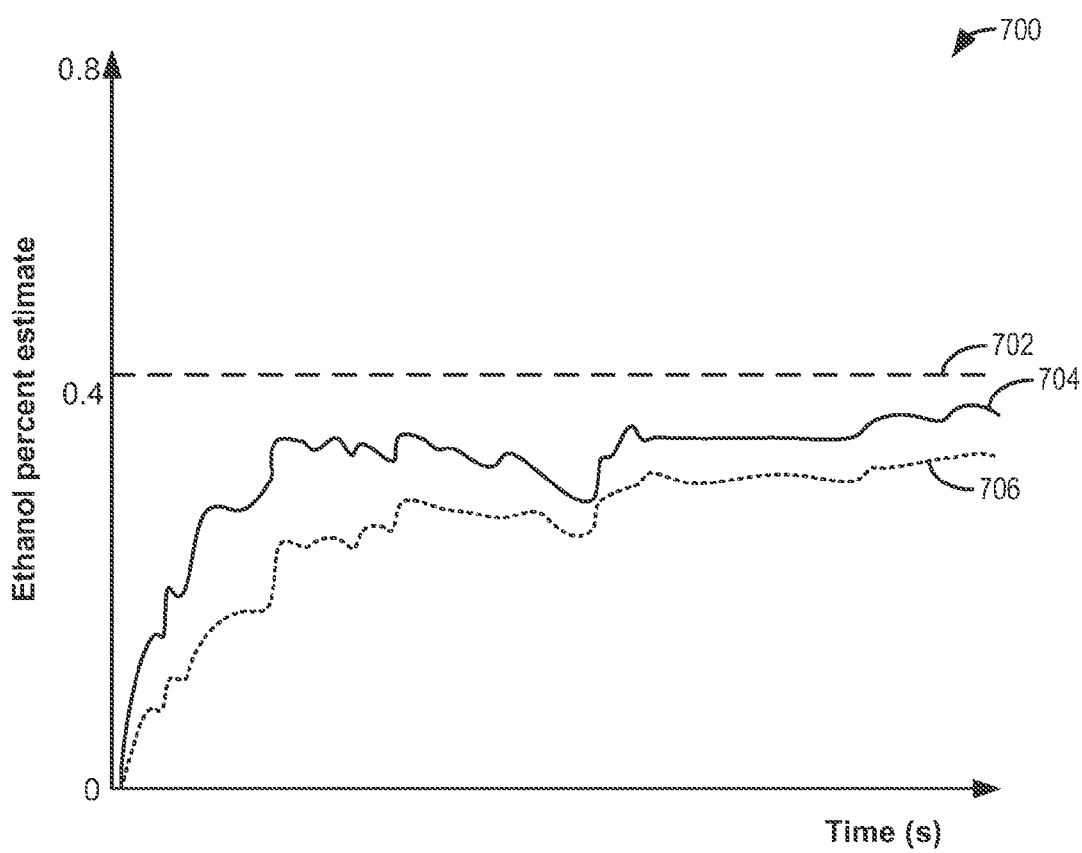

Embodiments of fuel make-up estimation based on fuel volatility effects in a wall-wetting system are disclosed herein. The approach takes advantage of the changes in fuel behavior in an engine cylinder intake port caused by changes in the fuel make-up, for example changes in fuel alcohol content. By relating the different ways a fuel behaves in the intake port depending on its make-up, it is possible to use feedback from the exhaust air-fuel ratio sensors to learn the fuel make-up over time. This learned fuel make-up can then be used to improve fuel injection control, air-fuel ratio control, spark timing control, and various other portions of engine and vehicle operation. Further, the learned fuel make-up can also be adjusted based on other ways to estimate the fuel make-up, including based on changes in the stoichiometric air-fuel ratio, if desired. FIG. 1 describes an example engine system in which the various approaches described herein may be implemented. FIG. 2 illustrates a block diagram of the estimation approach for learning the fuel make-up. FIGS. 3-5 describe overall operation for engine control, including fuel injection and fuel make-up learning, including additional information on the estimation and various control actions that can be taken with the improved estimate of the fuel make-up. FIGS. 6-7 show example engine data illustrating the performance and advantage of the example approaches described herein.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (also referred to as a combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. Compressor 174 boosts intake air delivered to the cylinder to a desired level based on operating conditions. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be a suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Further, additional exhaust gas oxygen sensors can be provided downstream of sensor 128.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position, angle, lift, and/or timing of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. The compression ratio may be in the range of 9:1 to 10:1. However, in some examples where different fuels are used, the compression ratio may be increased. This may happen for example when higher octane fuels or fuels with higher latent enthalpy of vaporization are used. The compression ratio may also be increased in an example including direct injection due to its charge cooling effects, for example.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including a port fuel injector 170. Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW received from controller 12 via electronic driver 171. Fuel may be delivered to fuel injector 170 by fuel system 173 including a fuel tank, a fuel pump, and a fuel rail. The port injected fuel may be delivered during an open intake valve event, closed intake valve event (e.g., substantially before the intake stroke), as well as during both open and closed intake valve operation.

As described above, FIG. 1 shows only one cylinder of a multi-cylinder engine. As such each cylinder may similarly include its own set of intake/exhaust valves, fuel injector(s), spark plug, etc.

A fuel tank in fuel system 173 may hold fuel with a variable fuel make-up, such as different fuel compositions. These differences may include different alcohol content, different octane, different heat of vaporizations, different fuel blends, and/or combinations thereof etc. In one example, fuel blends used may include alcohol containing fuel blends ranging from E85 (which is approximately 85% ethanol and 15% gasoline) to E10 (which is approximately 10% ethanol and 90% gasoline).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Engine 10 may further include a fuel vapor purging system (not shown) for storing and purging fuel vapors to the intake manifold of the engine via vacuum generated in the intake manifold. Additionally, engine 10 may further include a positive crankcase ventilation (PCV) system where crankcase vapors are routed to the intake manifold, also via vacuum.

Storage medium read-only memory 110 can be programmed with computer readable data representing instructions executable by processor 106 for performing the methods described below as well as other variants that are anticipated but not specifically listed.

Feedback from exhaust gas oxygen sensors can be used for controlling the air-fuel ratio. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio), such as sensor 128, can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. As described in more detail below, adjustments may be made with injector 170 depending on various factors.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

Fuel puddles are commonly created in intake ports of port fuel injection engines. The injected fuel can attach to the intake manifold walls after injection and the amount of fuel inducted can be influenced by intake manifold geometry, temperature, and fuel injector location. Since each cylinder can have a unique port geometry and injector location, different puddle masses can develop in different cylinders of the same engine. Further, fuel puddle mass and engine breathing characteristics may change between cylinders based on engine operating conditions. Due to the loss of fuel to the port puddle, the engine may not receive the entire amount of fuel intended to be injected by the fuel injection. However, as the fuel in the port puddle later evaporates into the cylinder during an intake stroke, the engine could potentially receive too much fuel when such fuel is received in addition to a fuel injection. As such, an amount of a fuel injection may be adjusted to account for the port puddling effect.

However, not only may the physics of the fuel in the port puddle be difficult to model, but this may be further complicated by a fuel having multiple components wherein each component evaporates at a different rate since each component may have a different vapor pressure. Moreover, due to the varying volatility of flex fuels available at the pump (e.g., depending on season and location), verifying ethanol content of the fuel may further complicate modeling port puddle evaporation.

While the fuel make-up, such as the ethanol content, can be estimated by estimating the stoichiometric air-fuel ratio of the air and fuel via feedback from the exhaust air-fuel ratio sensors and feed-forward estimates of the injected fuel mass (e.g., via injector characteristics) and airflow (e.g., from the MAF and/or MAP sensors), errors in the feed-forward information can degrade the estimate. For example, a fuel ethanol percent can be estimated by comparing UEGO sensor readings, which indicate air-fuel ratio (AFR) relative to stoichiometry for a given fuel, with estimates of the injected air-to-fuel ratio. The stoichiometric AFR varies with percent ethanol from about 14.6 for regular gasoline to 9 for pure ethanol. An E85 blend has the stoichiometric AFR of approximately 10. Part-to-part variability (e.g., changes in injector characteristics such as the amount of fuel injection for a given pulse-width command) or aging variation can cause undesirable errors in estimating ethanol content. A relative error in the air charge estimate (for example, due to MAF sensor drift) and/or injector slope affects the absolute ethanol percent estimate multiplied by a factor of about 2 (e.g. 1.8 to 2.6). For example, an erroneously low reading by 5% of the MAF sensor and regular gasoline fuel results in the detection system reporting about 13% ethanol (e.g., 5% times 2.6). Therefore, rather than relying solely on the change of the stoichiometric AFR, the ethanol percent can also be estimated based on fuel volatility as described further with regard to FIGS. 3-5. Specifically, ethanol is less volatile at low temperatures and more volatile at high temperatures as compared to gasoline. The difference in volatility has an impact on transient fuel control (TFC), in particular in port fuel injected (PFI) engines. To keep the AFR within the desired limits, the TFC adjusts the fueling compensation for the engine wall wetting based on the estimated ethanol content. The TFC tables are then calibrated for E0 and E85 and interpolated in between.

Specifically, the example approaches herein use the volatility differences due to ethanol percent to adjust the estimate of the ethanol percent in the fuel tank. Two TFC based models, each running a different ethanol percent are compared to the measured output in order to adaptively learn the fuel make-up. Some example advantages of this approach include reduced sensitivity errors and biases in fuel injector characteristics (such as injector slope and/or offset) and/or airflow errors and biases (e.g., due to drift or variation in the MAF/MAP sensors). This is because the estimate is driven by changes in the fuel evaporation in the port, which are less sensitive to biases in estimates of injected fuel mass and cylinder air amount values.

While such an approach may react more slowly to changes in the fuel make-up (e.g., due to a fuel tank refill), the overall amount of time relative to vehicle operation is manageable. Further, the estimate can be further enhanced and supplemented by utilizing changes in the stoichiometric AFR, if desired.

Referring now specifically to FIG. 2, it depicts a block diagram 200 illustrating a method for ethanol percent estimation using a twin-model structure. In this embodiment, the system takes advantage of the approach where, based on a transient fuel model of the wall-wetting effect that takes into account the fuel make-up, an accurate exhaust AFR can be determined. In this way, the effects of a change in ethanol content in the fuel on the in-cylinder AFR can be compared to the observed AFR (from the UEGO sensor) to update the estimate of the fuel make-up accordingly.

As shown in FIG. 2, operating parameters including the fuel injection amount, MAP, coolant temperature, engine speed, and others are each passed to each of a first and second transient AFR models depicted at 210 and 212, respectively. The models each compute the expected exhaust AFR and are sensitive to perc_EtOH, the ethanol percent estimate based on fuel volatility. Such a model can be adapted from the transient fuel compensation, such as described in FIG. 4 herein. The first model (210) applies a higher ethanol percent than the currently estimated percent. The second model (212) applies a lower ethanol percent than the currently estimated percent. In this way, each model operates with a delta (±delta_EtOH) from the currently estimated percent value. The average estimated AFR output of the two models (AFR_estimate) represents an AFR estimate at the currently estimated ethanol percent.

The difference between the two model outputs, delta_AFR, represents a measure of the sensitivity of the AFR estimate to perc_EtOH. If the difference between the measured UEGO AFR and the AFR_estimate signals has the same sign as the delta_AFR, the system infers that the actual ethanol content is higher than the average and the perc_EtOH is adjusted upward, while if the sign is opposite, the perc_EtOH is adjusted downward. To remove the impact of the sensor or injector offset or slope error, the signals are high-pass filtered at 214 and 216, respectively. This action reduces the steady state component of each signal and is consistent with the effect of fuel volatility, which is observed only during transients. In one example, the observance via the first and second models is carried out responsive to a transient condition, such as when the change in fuel injection amount from one injection to the very next injection is greater than a threshold amount.

The two models 210 and 212, which compute estimated air-fuel ratio at two different ethanol percent levels, may be otherwise identical, in one example Likewise, the high pass filters may also be identical and are used to remove low frequency components of the signals—in particular, steady state offsets. Further, additional clips on the estimated AFRs or estimated ethanol percentages may be included. For example, the ethanol estimate can be clipped to between 0 and 0.85 (for E85, for example), or to between 0 and 1 (for E100, for example). Also, the speed of adaptation and sensitivity to noise can be adjusted by clips and dead zones (around zero error) added on the two high pass filter outputs.

Continuing with FIG. 2, an integrator 218 adjusts the Perc_EtOH upward if the difference between the measured UEGO AFR and the AFR_estimate signals has the same sign as the delta_AFR and downward if the opposite is the case. The gain γ controls the speed of adjustment of Perc_EtOH.

In this way, a well calibrated transient fuel control system for variable ethanol content can be used to assess an impact of a change in ethanol content on an in-cylinder AFR, compare it to an observed AFR, and update a fuel ethanol content estimate accordingly.

Referring now to FIG. 3, an example method 300 is shown that may be performed by an engine controller to adjust a fuel injection amount to compensate for wall-wetting and evaporation effects in the intake port. This may include adjusting such compensation depending on the fuel make-up, such as based on an ethanol percentage. Specifically, the compensation and adjustments may be based on an amount of fuel in the fuel puddle, the composition of the fuel in the fuel puddle, vapor pressure of fuel constituents, fuel puddle dynamics, etc. One or more adaptive terms may be stored in a look-up table, as a function of engine speed, load, temperature, or combinations thereof, for example, indicating the learned ethanol percentage. Thus, an engine controller may adjust fuel injection to the engine based on the ethanol content of fuel in the port puddle. For example, engine 10 of FIG. 1 may be coupled in a flex fuel vehicle and may be configured to utilize fuel having two or more components and a variable ethanol content. Additionally, the engine controller may be configured to further utilize the adaptation approach to learn the ethanol percentage of the injected fuel by monitoring the transient fuel behavior of the system, as described herein.

At 302, method 300 includes determining engine operating conditions. This may include estimating and/or measuring an engine coolant temperature (ECT) that may be used to infer a port temperature. Other operation conditions estimated and/or measured may include, but are not limited to, engine temperature, engine speed, manifold pressure, air-fuel ratio, equivalence ratio, cylinder air amount, feedback from a knock sensor, desired engine output torque from pedal position, spark timing, barometric pressure, fuel vapor purging amounts, etc.

At 304, method 300 includes determining the desired engine output torque. In one example, the desired torque may be computed from a pedal position signal. At 306, method 300 includes determining an amount of a fuel injection. Based on the estimated engine operating conditions and the desired torque, and further based on the transient fuel compensation history of the cylinders, a feed-forward fuel injection setting and schedule may be determined. In one example, the controller memory may include a look-up table that may be used by the controller to determine the feed-forward setting and schedule of fuel injection types for each cylinder or cylinder group. The feed-forward settings may include determining a mode of fuel injection, or operating mixed-mode (for example all port fuel injection, all direct injection, or part port fuel injection—part direct fuel injection, etc.), and a ratio or percentage of injection between the direct injector and the port fuel injector. Other settings may include determining a timing of injection from each injector.

Next at 308, method 300 determines a first estimated exhaust air-fuel ratio based on previous fuel injection amounts, and a current estimate of ethanol percent (Perc_EtOH). The current estimate of the ethanol percent may be a fixed value, or may be based on previous learned estimates of the ethanol percent. Alternatively, the current estimate of the ethanol percent may be based on a nominal stoichiometry-based estimate of ethanol percent derived from feed-forward fuel volume estimates (e.g., from fuel injector slope and offset and delivered pulse-width) and cylinder air amount estimates (e.g., from the MAF sensor) where a shift in the stoichiometric air-fuel ratio is correlated to a percent ethanol based on known relationships of the various blend ratios. For example, as an ethanol content of a fuel increases, the increasing ethanol fuel contributes relatively more oxygen than a gasoline fuel, thus shifting the point of stoichiometry.

Specifically, at 308, the method first runs a transient fuel model (FIG. 4) using a higher value for the ethanol percentage of the fuel, and second runs the same transient fuel model (FIG. 4) using a lower value for the ethanol percentage of the fuel. That is, a fuel make-up (herein a fuel ethanol amount) is based on a comparison, during a fuel injection transient, of estimated air-fuel ratios with higher and lower assumed ethanol amounts to a measured air-fuel ratio. In one example, the higher assumed ethanol amount is clipped to less than 100% ethanol while the lower assumed ethanol amount is clipped to 0% ethanol. While the model is run twice in this example, three or more additional values of the estimated ethanol percentage (e.g., a middle value) may be used if desired.

In this way, the method applies the same model to the current operating conditions with at least two different values of the ethanol percentage, thereby estimating the air-fuel ratio in the cylinder based on wall wetting effects and the variation in such effects caused by changes in the fuel make-up (e.g., based on the ethanol percentage). Note that the only values that need to be kept separate in the controller are memory registers that record the puddle states between cycles. The code and the calibration to update the puddle and compute the air-fuel ratio are identical (thus only one copy is stored in the controller's memory). Likewise, the estimated air-fuel ratios (at higher and lower assumed ethanol amounts) are each determined with identical transient fuel models. The estimated air-fuel ratios and the measured air-fuel ratios are high-pass filtered with identical high-pass filters.

Next, at 310, the method updates the learned ethanol percentage based on the integrator output as shown with regard to FIG. 2. That is, a fuel make-up is learned based on variation in evaporation of fuel in an engine intake port, as estimated by two models, wherein the fuel on the port comprises two or more components. The fuel make-up is further based on a vapor pressure of the two or more components. The fuel make-up is further based on an amount of each of the two or more components of fuel evaporated from the port during an intake stroke. Further still, the fuel make-up is based on a fuel pulse-width and injector characteristics. In the current example, the fuel make-up is an ethanol amount in gasoline and the variation in evaporation accounts for different vapor pressures of constituents in the fuel of the port puddle.

Then, at 312, the method adjusts the fuel injection using the transient fuel model (again, FIG. 4) and the updated ethanol percentage so that the fuel injection takes into account the most recent and accurate value of the ethanol percentage in order to maintain the air-fuel ratio around the proper stoichiometric air-fuel ratio and taking into account the proper wall wetting dynamics. In this way, engine operation is adjusted in response to a learned fuel make-up. Specifically, an amount and timing of fuel injection to an engine is adjusted based on a fuel make-up, wherein the fuel make-up is based on variation in evaporation of fuel in the port puddle.

In this way, the transient wall-wetting effects caused by variation in the fuel vapor pressure with varying fuel ethanol content can be used advantageously in order to learn the ethanol content itself.

Referring now to FIG. 4, an example transient fuel model is provided that accounts for wall wetting dynamics, as well as variation in fuel vaporization caused by different fuel make-up (e.g., different ethanol content or other alcohol content of the fuel relative to gasoline).

Method 400 includes, at 402, receiving ethanol percentage values and other input parameters. The other input parameters include a fuel injection amount, MAP, coolant temperature, and engine speed, for example. Each of these parameters is passed to each of a first and second transient AFR model. Next, at 404, the method includes determining AFR based on the input parameters and the transient fuel models. Specifically, at 404, the twin-model algorithm, depicted at FIG. 2, may be run for estimating an ethanol percent in the fuel. By running the twin-model, the effects of a change in ethanol content in the fuel on the in-cylinder AFR are compared to an observed AFR (from a UEGO sensor), and a fuel ethanol content estimate is accordingly updated.

The models each compute the expected exhaust AFR and are sensitive to an ethanol percent estimate based on fuel volatility. One of the models applies a higher ethanol percent than the currently estimated percent, while the other model applies a lower ethanol percent than the currently estimated percent. In this way, each model operates with a delta (in each direction, + and −) from the currently estimated percent value. An average of the AFR estimates output by the two models is then compared to the AFR estimate of the currently estimated ethanol percent. Based on the difference, as well as the directionality of the difference (that is, whether the difference is positive or negative), the fuel ethanol content is adjusted from the current estimate stored in the controller.

As noted herein, the multi-model ethanol detection system uses two or more identical models that can estimate the air-fuel ratio in the cylinder. The air mass is continuously estimated by the control system, e.g., from the MAF sensor and engine speed, and is available as a variable, cyl_air_chg. The fuel mass estimate is needed at two different ethanol percent values and is obtained from the transient fuel control subsystem. The transient fuel control subsystem compensates for the wall wetting effect—the injected fuel either hitting the fuel puddle, typically in an engine port, or evaporating from the puddle. Computationally, it uses the desired mass of fuel in the cylinder, mf_des, the fraction of injected fuel that hits the puddle, X, and the variables that determine fuel vaporization from the puddle (puddle temperature (ECT), manifold pressure, engine speed, etc.) to determine the amount of fuel, mf_tfc, that needs to be added to compensate for the wall wetting effect. Given the above, the mass of fuel that enters the cylinder can be computed as equation (1):

$$mf\_cyl\_act = (1 - X(EtOH)) \times (mf\_inj - mf\_tfc(EtOH)) + X(EtOH) \times mf\_des + mf\_purge$$

where mf_inj is the mass of fuel injected in the port of a given cylinder and mf_purge is the controller's estimate of the vapor purge fuel. The quantity mf_cyl_act_1 corresponds to the first model output with EtOH_1=perc_EtOH+delta_EtOH and mf_cyl_act_2 corresponds to the second model output with EtOH_2=perc_EtOH−delta_EtOH. The way in which the ethanol amount affects the amount X may be based on vapor pressures of fuel components, and corresponding evaporation effects.

For example, the port puddle may include fuel having two or more components, where the components and make-up of the puddle fuel is different from that of the injected fuel. Examples of fuel components include, but are not limited to, ethanol, iso-pentane, iso-octane, n-decane, n-tridecane, etc. Accordingly, the components of the fuel, as well as their mass fractions in the total mass of the fuel in the puddle may be tracked. Further, if the fuel in the port puddle has an ethanol content (e.g., the fuel in the port puddle includes an ethanol component), the model may include determining the ethanol content of fuel in the port puddle. By determining the two or more components of the fuel in the port puddle in the model, properties of each component may be utilized to determine the amount of each component of fuel evaporated from the port puddle during the intake stroke.

Further, the model may include determining a vapor pressure for the fuel components, and thus the fuel, in the port puddle. In the case that the fuel includes multiple components, each component may have a different vapor pressure, and thus a vapor pressure may be determined for each component. As an example, vapor pressures for the components may be stored in a lookup table accessible by the controller. By determining the vapor pressure of the fuel in the port puddle (e.g., by determining the different vapor pressures of each of the different components of the fuel), the relationship between the fuel make-up and the cylinder air-fuel ratio can be more accurately represented.

Returning to FIG. 4, based on the estimate of cylinder fuel, the normalized in-cylinder AFR is given by equation (2):

$$AF\_cyl\_1 = \frac{1}{14.6} \frac{cyl\_air\_chg}{mf\_cyl\_act\_1}$$

$$AF\_cyl\_2 = \frac{1}{14.6} \frac{cyl\_air\_chg}{mf\_cyl\_act\_2}$$

Because the AFR information from the UEGO sensor is normalized to stoichiometry irrespective of the fuel make-up, the estimates of the AFR in the cylinder are normalized assuming gasoline fuel (14.6 stoichiometry). Further, due to the high-pass filters, no normalizing with regard to the actual stoichiometric AFR is needed.

As illustrated, one could thrift the computational demands by using mf_tfc=(mf_tfc_1+mf_tfc_2)/2 as the wall wetting compensation in the fuel injection at 312 of FIG. 3 (so the TFC compensation is already computed from ethanol detection). Alternatively, one could rewire the diagram of FIG. 2 to run EtOH_2=perc_EtOH, and use, now unperturbed by delta_EtOH, mf_tfc_2 for TFC compensation and for the AFR_estimate (instead of the average as shown in FIG. 2).

In this way, it is possible to apply the transient fuel model to determine different air-fuel ratios for different assumed ethanol percentages of the fuel, the model accounting for the variation in vapor pressure, evaporation, etc., of the different levels of ethanol content, thus computing different total amounts of fuel entering the cylinder. Further still, this same model can then be used with the most recently updated ethanol percentage to determine the desired fuel injection amount to achieve a desired air-fuel ratio. In this way, the fuel injection can then be adjusted to take advantage of the learned ethanol percentage, even during non-transient conditions.

One approach to increase the rate of learning of the multi-model method (e.g., the speed of convergence for the ethanol percent estimate) is to extend the approach by using the AF_stoic_1 and AF_stoic_2 (instead of an assumed 14.6) in computing normalized AF_cyl (see equation (2)). The signals AF_stoic_1 and AF_stoic_2 are obtained by using perc_EtOH+delta_EtOH and perc_EtOH−delta_EtOH respectively as ethanol percentages for the stoichiometric AFR for the two models. In addition, the high pass filters are removed, or bypassed, when operating according to this approach. The advantage of this modification is that there is now more information (volatility and stoichiometric AFR) available for updating the estimate. A disadvantage is that the sensitivity to air-flow and/or fuel injector slope variability may be reintroduced to some extent. FIG. 5 illustrates an example incorporating such modifications during selected conditions.

Specifically, method 500 of FIG. 5 includes applying the multi-model based estimate, perc_EtOH, and the nominal, stoichiometry-based estimate conv_EtOH together. At 502, a rank refill event is confirmed. A tank refill event may be determined in response to an increase in the fuel tank level as detected during initial vehicle operation or during an engine start, for example. At 510, after a tank fill event is confirmed, the method runs the multi-model approach that includes fuel volatility and stoichiometric AFR effects of ethanol, with the high-pass filters disabled. As such, the nominal, stoichiometry-based estimate conv_EtOH is updated based on the fuel pulse-width, engine airflow, and assuming the combustion is at stoichiometry (based on feedback from the exhaust air-fuel ratio sensors). Alternatively, because the stoichiometric effects dominates the volatility effect, we could refer to the multi-model estimate obtained by both effects enabled as the conv_EtOH.

At 511, it may be confirmed that a threshold amount of time (e.g., 100 seconds) from the engine start has elapsed. At 512, after the threshold time from start, e.g., 100 seconds, has elapsed, the high-pass filters are enabled and the estimate transitions to the volatility-based estimate in computing perc_EtOH. At 514, the difference between perc_EtOH and conv_EtOH is filtered and stored as a correction term, EtOH_corr. At 516, based on the EtOH_corr signal, a correction factor AFR_corr may be added to equation (2) to reduce sensitivity to sensor or injector variability when reengaging the stoichiometry effect after the next refill according to equation (3):

$$AF\_cyl\_1 = \frac{1}{AFR - Stoic\_1} \frac{cyl\_air\_chg}{mf\_cyl\_act\_1} \times AFR\_corr$$

$$AF\_cyl\_2 = \frac{1}{AFR - Stoic\_2} \frac{cyl\_air\_chg}{mf\_cyl\_act\_2} \times AFR\_corr$$

The relationship between EtOH and AFR_stoich is AFR_stoich=14.5−5.6*EtOH (E0 stoichiometry is about 14.3 to 14.6 and E100 is 9). The correction factor AFR_corr is stored and updated in the controller's memory.

If a fuel tank refill event is not confirmed at 502, then at 504, the method includes running the twin model estimate and determining an ethanol percent estimate based on the fuel volatility model estimate as well as the nominal stoichiometry based estimate.

In this way, responsive to a fuel tank refill event and during steady engine operating conditions, an engine controller may determine a fuel ethanol percentage based on stoichiometry of combusted air and fuel. During a transient fuel injection, the controller may determine the fuel ethanol percentage based on a comparison of estimated air-fuel ratios with higher and lower assumed ethanol percentages to a measured air-fuel ratio. The estimated air-fuel ratios are based on different fuel vaporization characteristics of the higher and lower assumed ethanol percentages. The controller may then adjust engine operation in response to the fuel ethanol percentage.

Example test results are illustrated in FIGS. 6-7 for the approach depicted in FIG. 2. The results are based on sample engine data run with an intermediate fuel blend (41% as estimated by the stoichiometry-based method). Map 600 of FIG. 6 shows the performance of the approach illustrated in FIG. 2 starting from two initial conditions on the opposite ends (E0 and E77) as depicted at plots 604 and 606. The methods are carried out even during the cold start (starting at time zero and before threshold time t1 has elapsed). The input signals, fuel_inj, cyl_air_chg, MAP, RPM, ECT, etc., are collected during vehicle operation from sensed values. Even in the presence of large disturbances, it is possible to adapt toward the correct ethanol amount (compare plots 604 and 606 to nominal stoichiometry based estimate 602). Such operation is particularly advantageous in that the learning is not only available during transient, but in fact takes advantage of the transient operation.

An advantage of learning the ethanol percentage from the transient fuel behavior in the intake port puddle is that it is significantly less sensitive to errors in the fuel injector characteristics or airflow estimates, as shown in map 700 of FIG. 7. For example, a nominal ethanol percent estimate 702 (generated simply from the fuel pulse-width, MAF, and measured UEGO) is directly affected by such errors. A 20% error in the air flow (air charge) causes the nominal ethanol estimate to read around 0 (instead of 0.41) while the −20% error would result in an ethanol estimate of about 0.8 (i.e. E80) in the example illustrated in FIG. 7. FIG. 7 also shows that such a large air charge error has a minimal impact (only about ±0.02) on the transient fuel based approach (see plots 704 and 706) illustrated in FIG. 2. Specifically, plot 704 depicts the twin-model estimate with +20% MAF sensor error while plot 706 depicts the twin-model estimate with −20% MAF sensor error. Even this is mostly the result of different effective adaptation gains, as shown by the faster adaptation with larger sensor reported air-flow.

In this way, by correlating for the amount of fuel from the port puddle that evaporates into the engine during an intake stroke, the ethanol content of the puddle fuel, and thus ethanol content of the injected fuel, can be estimated during transient conditions. Further, an ethanol content independent of combustion stoichiometry can be obtained, even during transients, that is less sensitive to part variation and sensor drift.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

Further, the illustrated example methods may be utilized for each cycle or event of fuel injection.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure

The invention claimed is:

1. A method, comprising:
adjusting engine operation in response to a fuel make-up, the fuel make-up based on a comparison of a first difference to a second difference, the first difference being between a first estimated air-fuel ratio at a higher assumed ethanol percentage and a second air-fuel ratio at a lower assumed ethanol percentage, the second difference being between a measured air-fuel ratio and an average of the first and second estimated air-fuel ratios, the estimated air-fuel ratios being based on variation in evaporation of fuel on an engine intake port.

2. The method of claim 1, wherein adjusting engine operation includes adjusting an amount and timing of fuel injection to the engine based on the fuel make-up.

3. The method of claim 1, wherein the fuel make-up is an ethanol amount in gasoline, and wherein the variation in evaporation accounts for different vapor pressures of constituents in the fuel in a port puddle.

4. The method of claim 1, wherein the fuel on the intake port comprises two or more components, and wherein the fuel make-up is further based on a vapor pressure of each of the two or more components.

5. The method of claim 4, wherein the fuel make-up is further based on an amount of each of the two or more components of fuel evaporated from the port during an intake stroke.

6. The method of claim 1, wherein the fuel make-up is an ethanol amount, and the fuel make-up is based on a comparison, during a fuel injection transient, of estimated air-fuel ratios with higher and lower assumed ethanol amounts to a measured air-fuel ratio.

7. The method of claim 6, wherein the higher assumed ethanol amount is clipped to less than 100% ethanol, and wherein the lower assumed ethanol amount is clipped to 0% ethanol.

8. The method of claim 6, wherein the estimated air-fuel ratios and the measured air-fuel ratio are high-pass filtered with identical high-pass filters.

9. The method of claim 6, wherein the estimated air-fuel ratios are each determined from identical transient fuel models.

10. The method of claim 1, wherein the fuel make-up is further based on a fuel injector pulse-width and injector characteristics.

11. The method of claim 1, wherein the engine is coupled in a flex fuel vehicle and is configured to utilize fuel having two or more components and a variable ethanol content.

12. A method, comprising:
adjusting engine operation in response to a fuel ethanol percentage, the percentage based on a comparison of a first difference to a second difference, the first difference being between a first estimated air-fuel ratio at a higher assumed ethanol percentage and a second air-fuel ratio at a lower assumed ethanol percentage, the second difference being between a measured air-fuel ratio and an average of the first and second estimated air-fuel ratios, the estimated air-fuel ratios being based on variation in evaporation of fuel on an engine intake port during a transient condition.

13. The method of claim 12, wherein adjusting engine operation includes adjusting an amount and timing of fuel injection to the engine based on the fuel ethanol percentage, and wherein the variation in evaporation accounts for different vapor pressures of fuel constituents in a port puddle.

14. The method of claim 12, wherein the fuel ethanol percentage is based on a comparison, during the transient condition, of estimated air-fuel ratios with higher and lower assumed ethanol percentages to a measured air-fuel ratio.

15. The method of claim 14, wherein the higher assumed ethanol percentage is clipped to less than 100% ethanol, and wherein the lower assumed ethanol percentage is clipped to 0% ethanol, and wherein the estimated air-fuel ratios and the measured air-fuel ratio are high-pass filtered with identical high-pass filters.

16. The method of claim 15, wherein the engine is coupled in a flex fuel vehicle and is configured to utilize fuel having a variable ethanol content.

17. A method, comprising:
responsive to a fuel tank refill and during steady engine operating conditions, determining a fuel ethanol percentage based on stoichiometry of combusted air and fuel;
during a transient fuel injection, determining the fuel ethanol percentage based on a comparison of a first difference to a second difference, the first difference being between a first estimated air-fuel ratio at a higher assumed ethanol percentage and a second air-fuel ratio at a lower assumed ethanol percentage, the second difference being between a measured air-fuel ratio and an average of the first and second estimated air-fuel ratios; and
adjusting engine operation in response to the fuel ethanol percentage.

18. The method of claim 17, wherein the estimated air-fuel ratios are based on different fuel vaporization characteristics of the higher and lower assumed ethanol percentages, the higher assumed ethanol percentage being clipped to less than 100% ethanol, and the lower assumed ethanol percentage being clipped to 0% ethanol.

19. The method of claim 18, wherein the estimated air-fuel ratios and the measured air-fuel ratio are high-pass filtered after determining the fuel ethanol percentage based on stoichiometry of combusted air and fuel.

20. The method of claim 19, wherein the engine is coupled in a flex fuel vehicle and is configured to utilize fuel having variable ethanol content.

\* \* \* \* \*